(12) United States Patent
Lohmann et al.

(10) Patent No.: US 11,167,783 B2
(45) Date of Patent: Nov. 9, 2021

(54) OPERATING HEAD FOR AN INDUSTRIAL TRUCK

(71) Applicant: Jungheinrich Aktiengesellschaft, Hamburg (DE)

(72) Inventors: Helmut Lohmann, Gyhum (DE); Michael Schueler, Schoenberg (DE); Holger Brunckhorst, Norderstedt (DE); Andreas Knie, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 121 days.

(21) Appl. No.: 16/750,398

(22) Filed: Jan. 23, 2020

(65) Prior Publication Data

US 2020/0239056 A1 Jul. 30, 2020

(30) Foreign Application Priority Data

Jan. 25, 2019 (DE) ...................... 10 2019 101 863.3

(51) Int. Cl.
*B62B 5/06* (2006.01)
*B62D 1/22* (2006.01)
(Continued)

(52) U.S. Cl.
CPC .............. *B62B 5/066* (2013.01); *B62B 5/063* (2013.01); *B62D 1/22* (2013.01); *B66F 9/07568* (2013.01); *B66F 9/205* (2013.01); *G05G 5/03* (2013.01)

(58) Field of Classification Search
CPC ....... B62B 5/063; B62B 2203/20; B62D 1/22; B66F 9/07568
See application file for complete search history.

(56) References Cited

U.S. PATENT DOCUMENTS 3,187,829 A * 6/1965 Ulinski ................... B60T 1/065
180/19.1
3,190,994 A * 6/1965 Becker ................... H01H 19/62
200/61.85
(Continued)

FOREIGN PATENT DOCUMENTS

CN 208150893 U * 11/2018 ................ B66F 9/24
DE 3840801 A1 6/1990
(Continued)

OTHER PUBLICATIONS

DE102019101863.3; filed Jan. 25, 2019; German Search Report dated Feb. 12, 2020 (7 pages).

*Primary Examiner* — Jeffrey J Restifo
(74) *Attorney, Agent, or Firm* — Barclay Damon LLP

(57) ABSTRACT

An operating head for an industrial truck comprises a support extending along a longitudinal axis and comprising opposing carrier sections. One or more gripping sections are positioned opposite each of the opposing carrier sections, wherein the opposing carrier sections and gripping sections at least partially define a handle opening. The operating head further comprises at least one operating element positioned on at least one of the opposing carrier sections. The at least one operating element comprises a cylindrical body extending along a cylindrical body axis and defining a bulge extending radially from the cylindrical body along a bulge axis. The bulge extends towards the one or more gripping sections when the at least one operating element is in a rest position and the at least one operating element is pivotable about the cylindrical body axis by exerting a force against the bulge.

13 Claims, 5 Drawing Sheets

(51) Int. Cl.
B66F 9/075 (2006.01)
B66F 9/20 (2006.01)
G05G 5/03 (2008.04)

(56) References Cited

U.S. PATENT DOCUMENTS

| | | | |
|---|---|---|---|
| 3,300,612 A | | 1/1967 | Quayle |
| 4,198,721 A | * | 4/1980 | Copeland ............ A47L 11/4075 15/50.1 |
| 4,444,284 A | * | 4/1984 | Montemurro ......... B62B 3/0612 180/19.1 |
| 5,033,326 A | * | 7/1991 | Powell ................ B62D 51/001 74/551.4 |
| 5,245,144 A | * | 9/1993 | Stammen ............. B62D 51/002 200/61.85 |
| D364,029 S | * | 11/1995 | Noonan ........................ D34/35 |
| 5,595,259 A | * | 1/1997 | Gilliland ............. B62D 51/001 16/430 |
| D384,478 S | * | 9/1997 | Prehn ............................. D34/35 |
| 5,964,313 A | * | 10/1999 | Guy ........................ B60L 3/02 180/332 |
| D445,552 S | * | 7/2001 | Pulskamp ................ B66F 9/20 D34/35 |
| 6,276,485 B1 | * | 8/2001 | Eriksson ............... B62B 3/0612 180/332 |
| D450,169 S | * | 11/2001 | Pulskamp ...................... D34/35 |
| D450,417 S | * | 11/2001 | Pulskamp ...................... D34/35 |
| 6,464,025 B1 | * | 10/2002 | Koeper ..................... B62B 5/06 180/19.2 |
| D497,463 S | * | 10/2004 | Swetish ........................ D34/35 |
| 7,017,689 B2 | * | 3/2006 | Gilliland ................. B62B 5/06 180/19.1 |
| D519,706 S | * | 4/2006 | Witt ............................... D34/35 |
| 7,237,645 B2 | * | 7/2007 | Lohmann ................. B62B 5/06 180/19.1 |
| 7,325,655 B2 | * | 2/2008 | Lohmann ................. B62D 1/14 180/315 |
| 7,383,915 B2 | * | 6/2008 | David ....................... B62B 5/06 180/332 |
| D593,274 S | * | 5/2009 | Knie ............................. D34/35 |
| 7,661,493 B2 | * | 2/2010 | Rose ...................... B62D 51/04 180/19.3 |
| 8,467,937 B2 | * | 6/2013 | Hanna ..................... B62B 5/063 701/41 |
| 8,504,241 B2 | * | 8/2013 | Hanna ................. B66F 9/07568 701/41 |
| 8,523,224 B2 | * | 9/2013 | Gallagher ................ B66F 9/06 280/748 |
| 9,205,882 B1 | * | 12/2015 | Hoffman ................... B66F 9/06 |
| 9,403,435 B2 | * | 8/2016 | Bejcek ................ B60K 26/021 |
| 10,730,728 B1 | * | 8/2020 | Qichen ..................... B66F 9/24 |
| 10,905,296 B2 | * | 2/2021 | Windmeisser ...... A47L 11/4044 |
| 2003/0029648 A1 | * | 2/2003 | Trego ................... B62D 51/001 180/19.1 |
| 2004/0099453 A1 | * | 5/2004 | Guy ....................... B62D 51/04 180/65.1 |
| 2004/0251073 A1 | * | 12/2004 | Gerbier .................... B62B 5/06 180/333 |
| 2006/0032695 A1 | * | 2/2006 | Lohmann ................ B62D 1/14 180/315 |
| 2017/0267506 A1 | | 9/2017 | Frei et al. |
| 2020/0239056 A1 | * | 7/2020 | Lohmann ........... B66F 9/07568 |
| 2020/0331733 A1 | * | 10/2020 | Jiandong ................. B60L 53/80 |

FOREIGN PATENT DOCUMENTS

| | | | |
|---|---|---|---|
| DE | 20008550 U1 | 5/2000 | |
| DE | 10352695 A1 | 6/2005 | |
| DE | 102014007078 A1 | 11/2015 | |
| DE | 102019101863 A1 * | 7/2020 | .......... B66F 9/07568 |
| EP | 0751060 A1 | 2/1997 | |
| EP | 1153815 A2 | 11/2001 | |
| EP | 3686152 A1 * | 7/2020 | ............. B66F 9/205 |

* cited by examiner

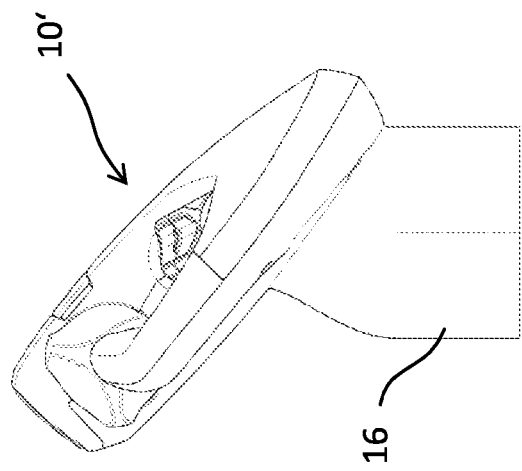
Fig. 2
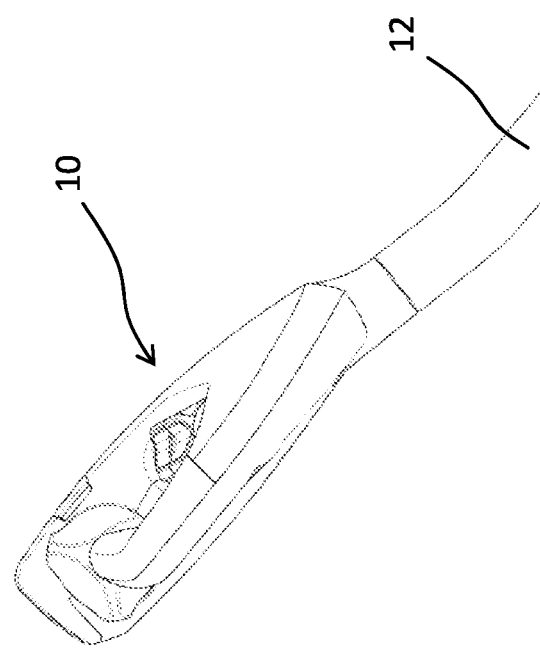
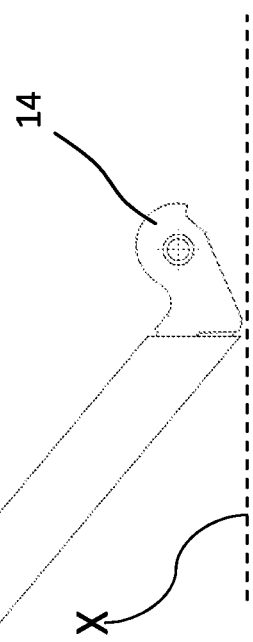
Fig. 1

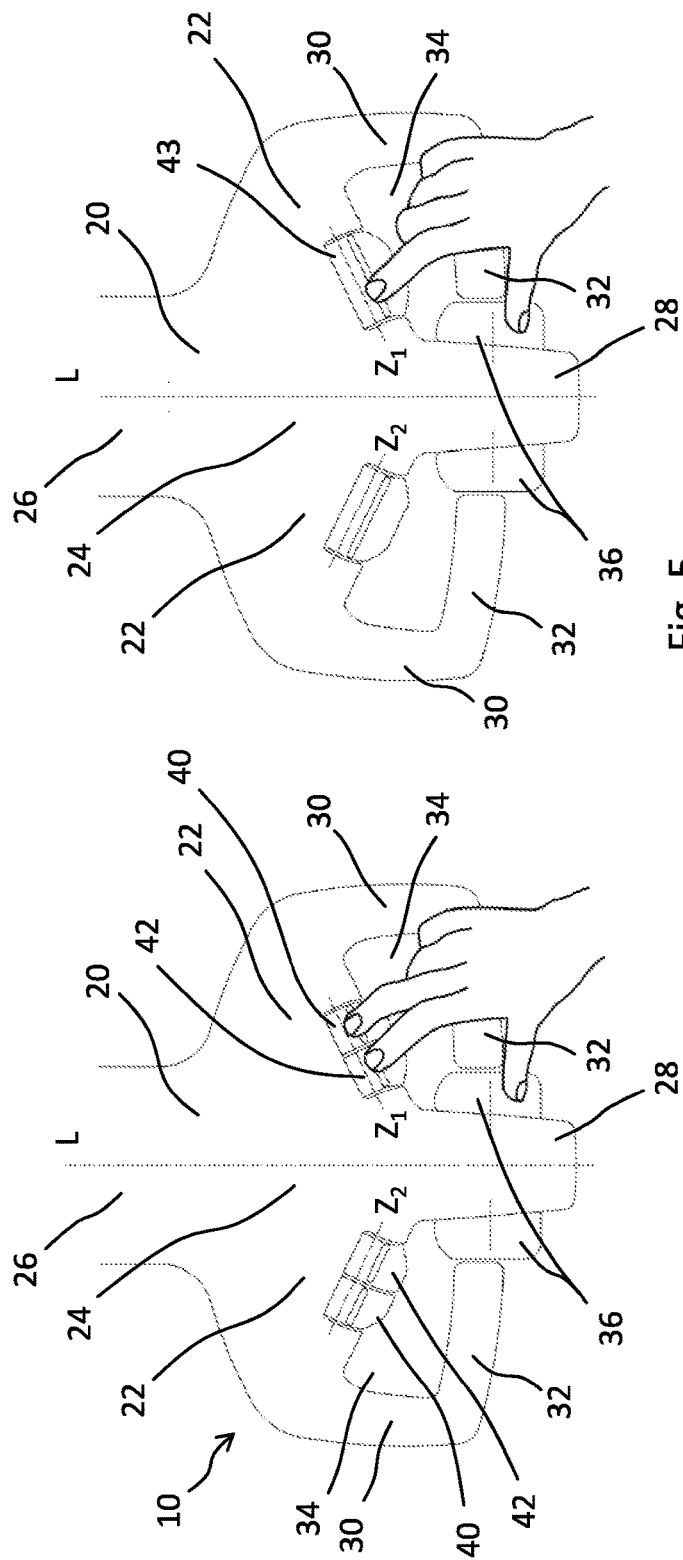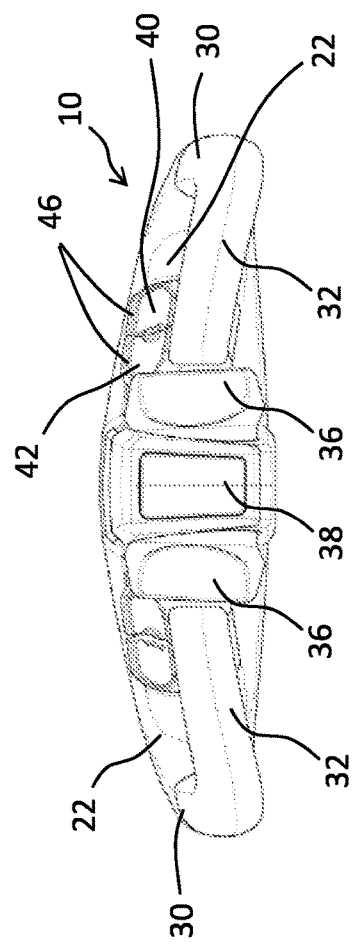

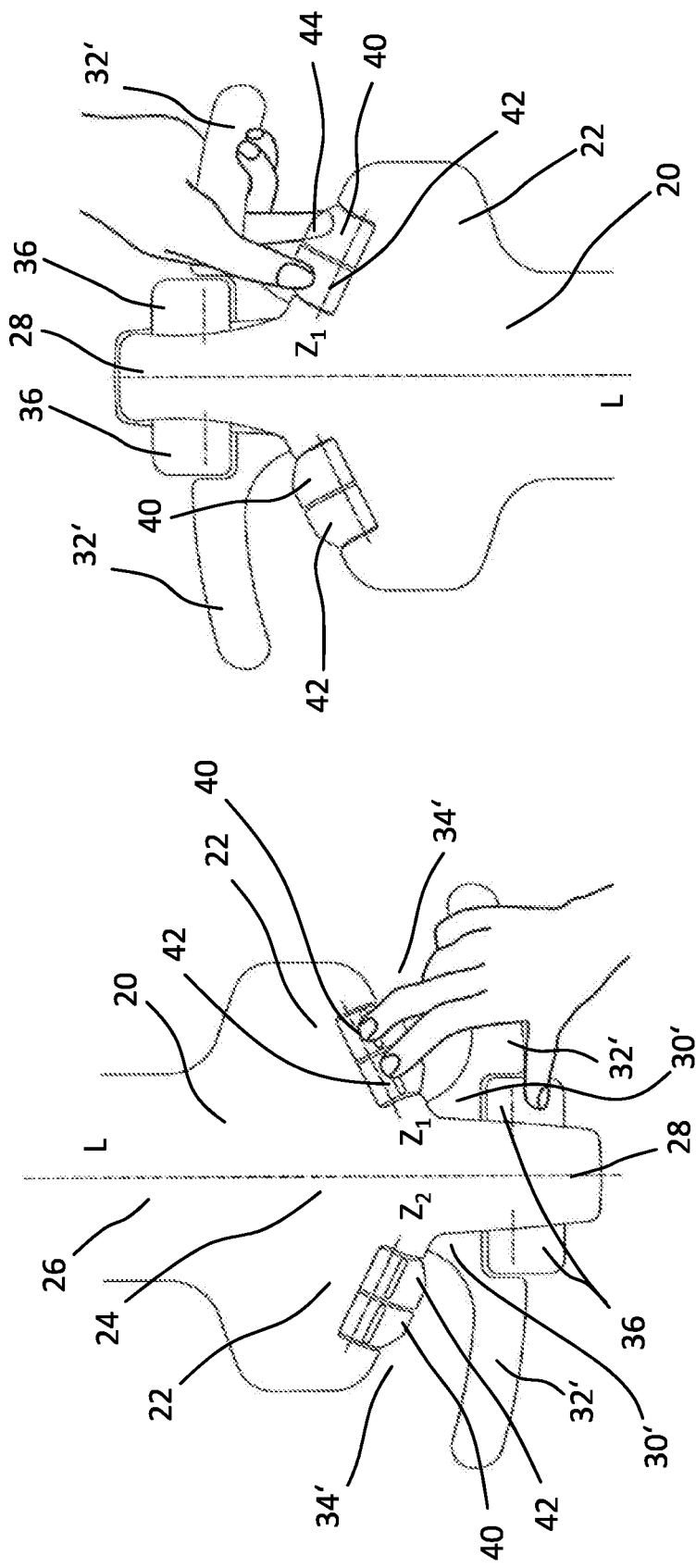

OPERATING HEAD FOR AN INDUSTRIAL TRUCK

CROSS REFERENCE TO RELATED INVENTION

This application is based upon and claims priority to, under relevant sections of 35 U.S.C. § 119, German Patent Application No. 10 2019 101 863.3, filed Jan. 25, 2019, the entire contents of which are hereby incorporated by reference.

BACKGROUND

The invention relates to an operating head for an industrial truck, comprising a horn or support extending along a longitudinal axis with carrier sections on opposite sides of the horn that extend along a carrier section axis (or axes) that intersect the longitudinal axis, and comprising handles connected to the horn with gripping sections arranged opposite the carrier sections, the opposite carrier sections and gripping sections each being spaced apart by a handle opening, at least one operating element being arranged on at least one of the carrier sections.

Industrial trucks, such as pallet trucks, feature such operating heads to steer the truck. The operating head can, for example, be arranged on an elongated drawbar shaft and, together with the drawbar shaft, can be crossed over two axes perpendicular to each other. Such a drawbar is usually provided on pedestrian vehicles where the operator walks alongside the industrial truck while engaging the operating head. The operating head is also referred to as the drawbar head. An operating head of the type mentioned above can also be arranged on a steering column and can only be rotated about an axis of rotation extending through the operating head, but otherwise it can be arranged so that it cannot tilt relative to the industrial truck. Such operating heads are usually used on industrial trucks where an operator is standing on a platform and is travelling with the truck. While the steering of the industrial truck is realized in both cases by tilting or turning the operating head relative to the industrial truck, other functions are carried out via operating elements arranged on the operating head. For example, the speed of forward or reverse travel can be regulated or the load of the industrial truck can be raised or lowered via such operating elements.

Operating heads of the type mentioned above are known for example from EP 07 51 060 A1 and DE 2 008 550 U1. Both documents describe drawbar heads which have operating elements designed as switch buttons in their carrier sections. Operation via such switch buttons is complex and time-consuming; in particular, only one function can be performed with each switch button. For example, one switch button can be used to raise the load unit and another switch to lower the load unit. At a free end of the horn of these operating heads, there are additionally driver shift handles mounted so as to be rotatable about a rotation axis.

DE 10 352 695 A1 describes a drawbar with an operating head which has paddle-shaped rocker switches on its carrier sections which can be tilted about a bearing axis. One of these rocker switches is used, for example, to raise or lower a load unit. To switch between these two functions, however, an operator who grasps the opposite gripping section with his hand must change his grip position in a cumbersome manner. Moving the rocker switch also results in less intuitive operation.

DE 10 2014 007 078 A1 concerns a control head with button-like control elements on the carrier sections, whereby the contact surfaces of these control elements to be contacted with the finger point upwards and away from the control head. These operating elements are difficult for an operator to access when his hand is grasping the opposite gripping section, especially when a drawbar shaft carrying the operating head is in an upright position.

Based on the discussed state of the art, the underlying task of the invention is providing an operating head for an industrial truck, which allows intuitive operation with good accessibility of operating elements arranged at the carrier sections.

BRIEF SUMMARY OF THE INVENTION

For an operating head of the aforementioned type, the invention solves the task by at least one operating element in the form of a cylinder with a bulge or protrusion extending radially away from the longitudinal axis of the cylinder, which, at least in a rest position of the operating element, points towards the opposite gripping section of the handle, the operating element being pivotable about its cylinder axis by engagement with the bulge.

As mentioned above, the operating head can be connected to an industrial truck via a tiltable drawbar shaft or a non-tiltable manner. In both cases, however, the operating head can be rotated about an axis of rotation relative to the industrial truck. By rotating around this axis of rotation, the industrial truck is steered to the left or right. The horn of the operating head, which extends along a longitudinal axis, may have a first end configured for attachment to the industrial truck or to other drawbar elements, such as a drawbar shaft. A second end of the horn opposite the first end on the longitudinal axis may be a free end. This free end may point in particular in the direction of the operator when using an industrial truck with such an operating head. The free end of the horn may also be provided with operating elements, for example driver control handles for controlling a forward movement or a backward movement of the industrial truck. Especially from a central section of the horn located between the first end and the second end, the two carrier sections may extend away from the longitudinal axis on opposite sides. Handles are carried on the carrier sections, each of which is provided with a gripping section. The handles can be connected to the carrier sections on either side of the horn, whereby the handles can then each have a shank section facing away from the carrier section, to which one of the gripping sections merges in the direction of the longitudinal axis. The shank sections can each extend away from their carrier sections and can, in particular, run approximately parallel to the longitudinal axis. The gripping sections can run at an angle to their respective shank sections, in particular at a substantially right angle. The two gripping sections again point in the direction of the longitudinal axis; in particular they can run approximately perpendicular to the longitudinal axis. The gripping sections can extend from opposite sides to the free end of the horn. The carrier section, shank section and gripping section and in particular the free end of the horn can then bound the handle opening between them. The gripping sections can also be located at the free end of the horn and extend from the free end of the horn on opposite sides. The handle openings can then be limited by the carrier section, the gripping section and the free end of the horn and can be open, especially to the sides. An operator using the operating head may reach his hands into each of the grip openings. In particular, an operator may grasp one of the gripping sections with one hand and, in particular, use his index or middle finger to operate the operating element located on the carrier section opposite the gripping section.

According to an embodiment, at least one cylindrical operating element is arranged on at least one of the carrier sections, which can be pivoted about its cylinder axis or cylindrical body axis. The cylinder axis can extend at an angle to the longitudinal axis of the horn or to an axis of extension of the opposite gripping section, in particular at an angle to the longitudinal axis of the horn and the axis of extension of the opposite gripping section. The at least one cylindrical operating element can project from its carrier section into the adjacent handle opening, in particular with its bulge. The bulge indicates an enlargement of the operating element in radial direction. The operating element may deviate from the cylindrical shape in the area of the bulge. The bulge extends radially from the cylinder axis of the operating element in such a way that, at least in a rest position of the operating element, it points to the gripping section opposite the carrier section that bears the operating element. In the rest position, the bulge can point in particular into the adjacent handle opening. If the operating element is deflected out of the rest position about the cylinder axis, the bulge can point in other directions. Due to the cylindrical design of the operating element with the bulge pointing in the direction of the gripping section, the operating element can be gripped particularly easily with the fingers of an operator who grasps the opposite gripping section with his hand. In particular, an operator can grip the bulge from opposite sides with two fingers, for example with the thumb and index finger, and thus hold the operating element between their fingers. Even when pivoting the operating element around the longitudinal axis of the cylinder, the operator can use both fingers to maintain contact with the bulge and thus maintain good control of the operating element at all times. The operating element is therefore particularly easily accessible and handling is very intuitive.

According to an embodiment, when an operator's hand grasps the gripping section opposite the bulge, the operating element can be gripped via its bulge from two opposite sides with the fingers of that hand. As previously explained, the bulge can be grasped from opposite sides with thumb and index finger, for example, and the operating element can thus be adjusted easily and intuitively. In particular, the operating element is arranged close to the opposite gripping section, so that an operator with at least an average hand size who grasps the gripping section with his hand can use his thumb and index or middle finger to grip the bulge of the operating element.

According to an embodiment, the at least one operating element is configured to pivot around its longitudinal cylinder axis in both opposite directions of rotation. The operating element can thus be pivoted in both directions about its cylinder longitudinal axis, in particular if it is gripped with two fingers from opposite sides in the area of the bulge. Thus, two functions are combined in one easily accessible operating element, which can be performed without the need to adjust the grasp the operator's hand or reposition the operator's fingers. For example, when rotating in a first direction of rotation around the longitudinal axis of the cylinder, a load part of an industrial truck can be lifted, whereas when rotating in the opposite direction, the load part can be lowered. The control element can thus combine the lifting function and the lowering function. However, the operating element can also be operated with only one finger by means of a corresponding actuation of the bulge.

According to an embodiment, the at least one operating element protrudes at least in parts from the carrier section, whereby the section of the operating element protruding from the carrier section is completely accommodated in the adjacent handle opening. The operating element is mounted on the carrier section so as to be pivotable about its longitudinal cylinder axis, as mentioned above. To ensure that the operating element can be reached, it protrudes at least partially from the carrier section. According to this embodiment, the operating element, in particular with its bulge, preferably protrudes towards the opposite gripping section at least in the rest position of the operating element. At least in the rest position, but preferably also in all possible positions of use, the section of the operating element projecting from the carrier section is completely accommodated in the adjacent handle opening. The operating element therefore does not protrude from the handle opening. For example, the operating element can protrude from a side wall of the carrier section which faces the opposite gripping section and defines the handle opening section. Due to the complete accommodation of the operating element within the handle opening, the operating element is particularly easy to access with the fingers for a hand gripping the opposite gripping section, especially in all possible positions of the operating element.

According to an embodiment, the operating element protrudes from the carrier section in such a way that at least 50% of the outer surface of the operating element is exposed. In other words, the portion of the control element protruding from the carrier section, in particular including the bulge, makes up at least 50% of the surface area of the control element. The surface referred is essentially the surface parallel to the longitudinal axis of the cylinder, even if it deviates from the cylinder shape in sections. An operating element exposed in this way is particularly accessible for an operator who grasps the opposite gripping section with his hand, with his fingers, especially in deflected positions of the operating element.

According to an embodiment, the bulge forms recesses on two opposite sides for the engagement of one finger of operator on either side. The bulge can therefore have recesses on opposite sides which are designed to accommodate one finger each of an operator. When grasping the gripping section opposite the operating element with one hand, the operator can reach into these recesses with the fingers of this hand, in particular with thumb and index finger. The recesses allow a secure grip and a good hold, especially when the operating element is pivoted about its longitudinal axis.

According to an embodiment, the at least one operating element has at least one operating cam formed in the outer surface. The operating cam extends out of the operating element as an extrusion. For example, the operating cam can sit on the bulge. The operating cam can also be located at the transition between the bulge and the cylindrical section of the control element. In particular, the operating cam can be formed on a top side of the operating element so that it can be engaged by the index finger or the middle finger of a hand gripping the opposite gripping section. If the operating element is accommodated in the adjacent handle opening with a section protruding from the carrier section, the operating cam in particular can also be accommodated in the handle opening in such a way that it does not protrude from it. If the operating cam is configured in this way, it extends at a steep angle to the direction of the bulge. For example, the operating cam can extend at a steep angle of 70° to 90° relative to the direction in which the bulge extends. Such an operating cam is particularly useful for the simple engagement of one of the fingers on the operating element. For example, if the operating cam is arranged on the top side of the operating element, it can be engaged by the index finger or the middle finger of a hand gripping the opposite gripping section and the operating element can be pivoted bout its longitudinal axis by moving the operating cam. In particular, the operating cam enables simple one-finger handling of the operating element. For example, by placing the fingertip against a front surface of the operating cam facing the gripping section at least in the rest position of the operating element, the operating element can be pivoted about the cylinder longitudinal axis in a first direction of rotation. By engaging an upper side or a rear side of the operating cam facing the gripping section at least in the rest position of the operating element with the fingertip, the operating element can be pivoted about the cylinder longitudinal axis in the opposite direction of rotation by pulling the operating cam towards the hand. This also enables simple one-hand operation of the control element.

According to an embodiment, the operating head comprises at least two cylindrical operating elements arranged on a common carrier section and each having a bulge extending radially away from the respective cylinder longitudinal axis, the bulges pointing towards the respective opposite gripping section of the handle at least in one rest position of the respective operating element. The respective operating element is pivotable about its cylinder longitudinal axis by engagement with the respective bulge. According to an embodiment, at least two of the operating elements according to the invention are thus provided on at least one of the gripping sections. The at least two operating elements can in particular be pivoted about the same longitudinal axis of the cylinder. Providing at least two control elements according to the invention on a carrier section allows the intuitive operation of several functions with only one hand in a simple manner. For example, an operator who grasps the opposite gripping section with his hand can use his index finger to grip a first control element and his middle finger to grip a second control element of the at least two control elements, in particular by making contact at the respective bulge. The operator can also use his thumb to counter-attack the respective control element in the manner described. For example, the first control element can be pivoted in both directions of rotation about its longitudinal axis of the cylinder to enable lifting or lowering in free lift, and the second control element can be pivoted in both directions of rotation about its longitudinal axis of the cylinder to enable lifting or lowering in mast lift.

According to an embodiment, the operating head comprises at least one driver's control handle located laterally at a free end of the horn, which is rotatable about an axis pointing away from the horn in the direction of one of the gripping sections. As mentioned above, the second end of the horn opposite the first end may have one or more driver's handles. In particular, two driver controls may be located on opposite sides of the free end of the horn. The driver control handle points in the direction of the adjacent grip section. The grip section may be directly adjacent to the drive control handle. The grip section can also be at a distance from the driver's control handle. The axis about which the control handle can be rotated can be parallel to an axis of extension of the adjacent grip section or at a flat angle to it.

The invention further relates to a drawbar for an industrial truck with a drawbar shaft which can be pivoted about a horizontal axis between an approximately upright position and a position inclined obliquely to the vertical and with an operating head according to the invention arranged at the free end of the drawbar shaft. The operating head can thus form a drawbar head of a drawbar-operated industrial truck. As previously mentioned, pedestrian vehicles in particular can be equipped with such drawbars. The drawbar can be pivoted about the horizontal axis for convenient operation. In addition, the drawbar shaft can be pivoted about a vertical axis and thus enables the industrial truck to be steered to the left or right by correspondingly pivoting a wheel coupled with the drawbar shaft. According to a specification to this effect, the at least one control element is grippable via its bulge when the gripping section opposite the bulge is grasped by the hand of an operator from two opposite sides with the fingers of that hand, both in the upright position and in the inclined position of the drawbar shaft. As previously discussed, the operating element can be grasped for example with index finger and thumb from opposite sides. If the operating head serves as the drawbar head, the present design ensures this in particular over the entire pivoting movement of the drawbar about the horizontal axis, i.e. also in an upright position of the drawbar. Therefore, the function to be carried out via the operating element can be reliably performed even when maneuvering space is limited.

The invention further relates to an operating unit for an industrial truck with a steering column that can only be rotated about a vertical axis of rotation and with an operating head arranged on the steering column in accordance with the invention. The operating head can, as also mentioned above, not only be arranged as a drawbar head on a drawbar shaft, but also on a steering column. In this case, the operating head can only rotate with the steering column about a vertical axis of rotation and in particular cannot be pivoted about a horizontal axis. Such operating units are intended in particular for industrial trucks in which the operator rides along for example on a stand-on platform.

The invention also relates to an industrial truck with a drawbar head in accordance with the invention or an industrial truck with a drawbar in accordance with the invention or an industrial truck with an operating mechanism in accordance with the invention.

BRIEF DESCRIPTION OF THE DRAWINGS

Different aspects of the invention are explained by the following figures. They show:

FIG. 1 illustrates a side perspective view of an embodiment of a drawbar head with an operating head;

FIG. 2 illustrates a side perspective view of an embodiment of the operating head attached to a steering column;

FIG. 3 illustrates a top plan view of an embodiment of the drawbar head;

FIG. 4 illustrates a side elevation view of an embodiment of the drawbar head;

FIG. 5 illustrates a top plan view of an embodiment of the drawbar head;

FIG. 8a illustrates a top plan view of an embodiment of the drawbar head; and

FIG. 8b illustrates a top plan view of another embodiment of the drawbar head.

Figure 6A:
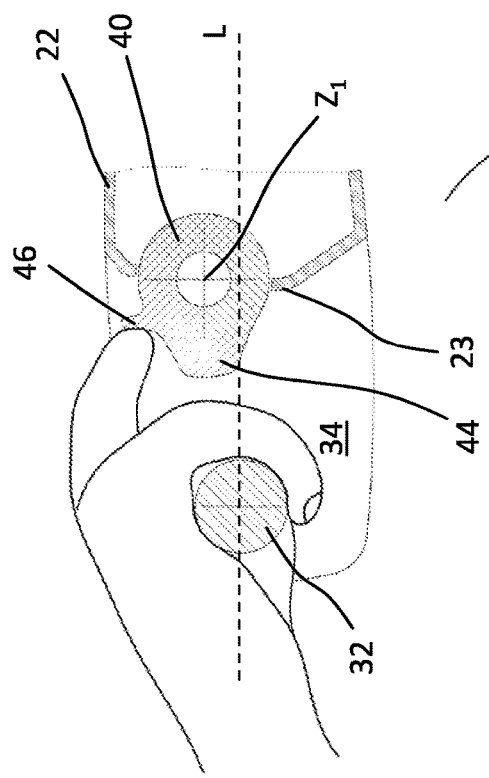
FIG. 6a illustrates a cross-sectional view of an embodiment of the operating head at a horizontal position.

Unless otherwise indicated, in the following, identical reference signs denote identical objects.

DETAILED DESCRIPTION OF THE INVENTION

FIG. 1 shows an operating head 10 used as a drawbar head, which is connected to a drawbar shaft 12, which in turn can be connected via a connection 14 to an industrial truck not shown. The drawbar formed by operating head 10 and drawbar shaft style 12 can be connected to an industrial truck in such a way that it can be pivoted upwards and downwards relative to the industrial truck about a horizontal axis X perpendicular to the image plane in FIG. 1. In addition, the drawbar can also be pivoted about a vertical axis lying in the image plane of FIG. 1 if it is appropriately suspended on an industrial truck, pivoting about the vertical axis making it possible to steer an industrial truck which in this case is designed as a pedestrian vehicle.

FIG. 2 shows an inventive control head 10' coupled to a steering column 16 instead of a drawbar shaft. Via the steering column 16, the operating head 10' can be mounted on the industrial truck so that it can rotate about a vertical axis lying in the image plane in FIG. 2. The control head and the steering column form a control unit as is common in particular on industrial trucks where an operator can travel with the truck, for example standing on a stand-on platform.

For FIGS. 3 to 7, the arrangement and operation of the controls is explained below with reference to control head 10, which is configured as a drawbar head. However, this applies in principle also to the control head 10' described above.

FIGS. 3 and 4 show the operating head 10 in a top view of an upper side and in a front view in the direction of a longitudinal axis L of the operating head 10. The operating head 10 comprises a horn 20 or support with two carrier sections 22 extending from the longitudinal axis L on opposite sides of a central section 24 of the horn. The central section 24 of the horn 20 extends from a first end 26, which is configured for connection to the drawbar shaft 12, to a second end 28 or free end positioned opposite the first end 26 along the longitudinal axis L. Rod-like handles are attached to the carrier sections 22, each consisting of a shank section 30 and a gripping section 32. In the embodiment shown, the shank sections 30 each extend away from their carrier sections 22 approximately parallel to the longitudinal axis L. The shank sections 30 in turn each merge into one of the gripping sections 32. As shown, the gripping sections 32 point towards the longitudinal axis L and are in particular approximately perpendicular to this axis. The gripping sections may also be approximately perpendicular to their respective shank section 30. The carrier section 22, shank sections 30 and gripping section 32 each delimit—in particular in conjunction with the free end 28 of the horn 20—handle openings 34. As shown, the handle openings 34 are not completely enclosed. The gripping sections 32 are spaced apart from the free end of the horn 20 or from driver control handles 36 arranged on opposite sides at the free end 28. Two operating elements 40, 42 are arranged on each of the gripping sections 32. In an embodiment, at least one of the operating elements 40, 42 is positioned on the carrier section 22 along a perimeter of the handle opening 34.

The operating elements 40, 42 are cylindrical in shape and each have a bulge 44 extending radially from their respective cylinder longitudinal axis $Z_1$, $Z_2$, as shown in particular in FIGS. 6a-7b. As shown, the control elements 40, 42 are being manipulated as right hand control elements and can be pivoted in both directions of rotation about their common cylinder longitudinal axis $Z_1$ relative to their carrier section 22. Likewise, corresponding left-hand control elements 40, 42 can be pivoted about their common cylinder longitudinal axis $Z_2$ relative to their carrier section 22 in both directions of rotation. As shown in FIG. 3, an operator can, for example, grasp the right gripping section 32 with his right hand and easily engage control element 42 with his index finger and control element 40 with his middle finger. The operator can also use his thumb to operate the right-hand driver's control handle 36. The vehicle can be moved back and forth by turning the driver's control handle 36 around its respective axes of rotation. Further functions of the industrial truck can be operated via the control elements 40, 42. For example, the free lift of a load section of the industrial truck can be performed via control element 42 and the mast lift of the load section can be performed with control element 40. Thus several functions can be carried out easily with only one hand and without having to reach around.

FIG. 5 shows a specification of drawbar head 10, in which only one cylindrical control element 43 is provided on each side, i.e. per carrier section 22. This can also be easily reached by the operator with the appropriate grip and operated in both directions of rotation with just one finger.

Figure 6B:
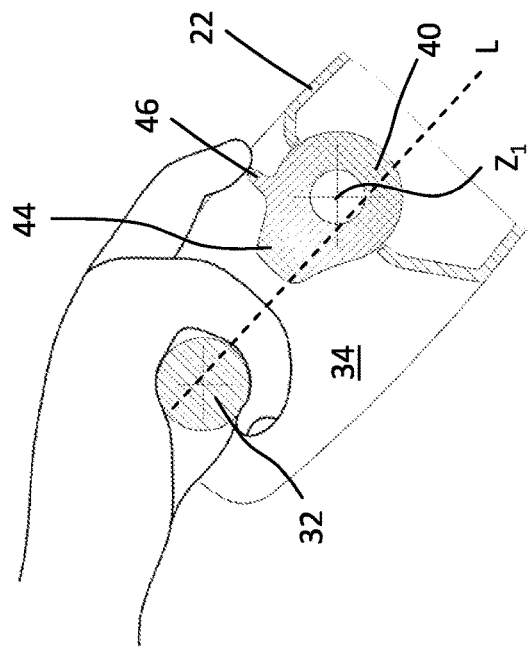
FIG. 6b illustrates a cross-sectional view of an embodiment of the operating head at an inclined position.

The operation of the controls 40, 42 and 43 is explained in the following using FIGS. 6 and 7. FIGS. 6a-c show a sectional view of control head 10 at different tilt angles of the drawbar. The drawbar shaft 12 is not visible here. In FIG. 6a the drawbar is tilted around its horizontal axis to such an extent that the longitudinal axis L of the drawbar head is essentially horizontal. As can be seen here, the operating elements 40, 42 and 43 also have operating cams 46 formed in a lateral surface, each of which extends essentially perpendicular to the direction of the bulge 44. In FIG. 6a, an operator grasps the gripping section 32 with his hand and engages the operating cam 46 on a front surface facing the gripping section 32 with the tip of his index finger. The operating element 40 is in a rest position. Here it is also evident that the bulge 44 extends from the cylindrical body of the operating element 40 in the direction of the gripping section 32. In particular, it can be seen that the operating element 40 protrudes in parts from a front surface 23 of the carrier section 22 facing the gripping section 32. In particular, the operating element 40 can protrude so far from the carrier section 22 that at least 50% of its outer surface is exposed. The part of the operating element 40 that protrudes from the carrier section 22 is completely accommodated in the adjacent handle opening 34. Due to these features, the operating element 40 is particularly easy to reach for an operator who grasps the opposite grip section with his hand. The same applies accordingly to the operating elements 42 and 43.

By engaging the front surface of the operating cam 46, an operator can now use his index finger to pivot the operating element 40 along a first direction of rotation about its longitudinal cylinder axis $Z_1$, which in this case is perpendicular to the image plane. As can be seen in FIG. 6b, the control element 40 can be moved in the opposite direction of rotation about the cylinder longitudinal axis Z1 by touching the upper side of the control cam 46 with the index finger. This enables easy one-finger manipulation via the operating cam.

Figure 6C:
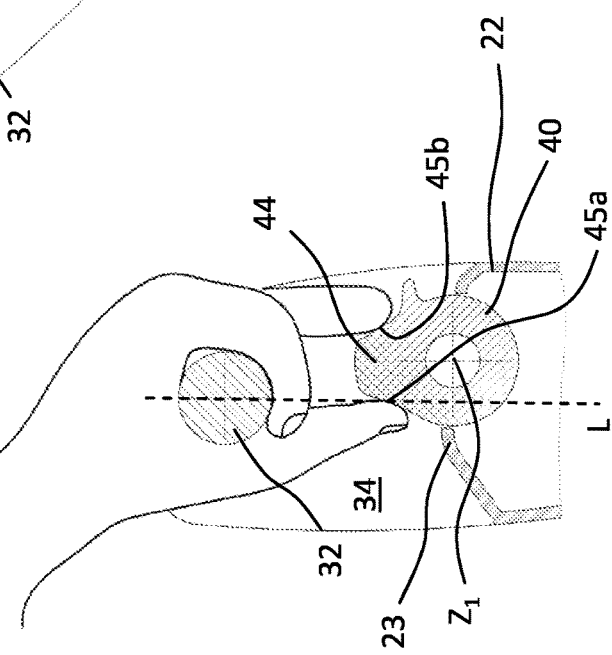
FIG. 6c illustrates a cross-sectional view of an embodiment of the operating head in a vertical position.

In particular, however, the bulge 44 on the control elements, which is in accordance with the invention, allows the control elements to be gripped with the fingers from two opposite sides, as shown in FIG. 6c. The operator reaches into small recesses 45 on opposite sides of the bulge 44, with his thumb into one recess 45a and with his index finger into the opposite recess 45b. The operating element 40 can thus be easily grasped by thumb and index finger, especially when the drawbar is tilted at an arbitrary angle, and can thus be pivoted in both directions of rotation about its longitudinal cylinder axis Z1.

Figure 7B:
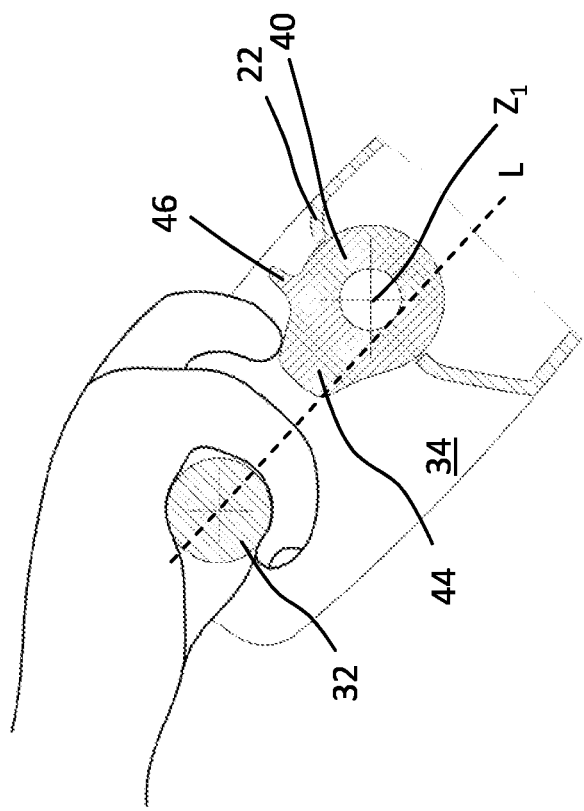
FIG. 7b illustrates a cross-sectional view of another embodiment of the operating head in an inclined position.
Figure 7A:
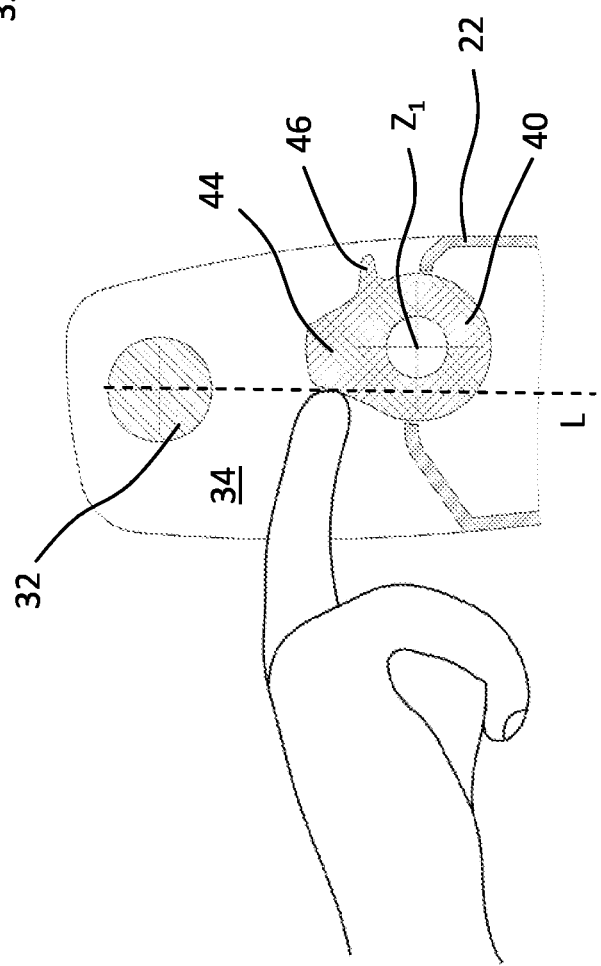
FIG. 7a illustrates a cross-sectional view of another embodiment of the operating head in a vertical position.

FIGS. 7a-b again show different inclinations of the drawbar. Here it is evident that simple one-finger operation is also possible via the bulge 44. Even with the drawbar in an almost upright position, the operating element 40 can be moved in one direction by pressing on the bulge, for example with the index finger of an operator. Movement in the opposite direction of rotation can also be achieved with one finger at least when the drawbar is slightly tilted, as shown in FIG. 7b. The operation is very intuitive, as the control element always performs the same function, for example lifting the load section, regardless of the orientation of the drawbar head when the direction of rotation around the cylinder axis is the same. This is particularly advantageous compared to the paddle-shaped rocker switches mentioned earlier, which, depending on the position of the drawbar head, require a change in operating direction to perform the same function. For example, with paddle-shaped rocker switches of this type, the rocker switch on the left must be operated for lifting the load unit if the load unit is accessed from above and the rocker switch on the right if it is accessed from below.

FIGS. 8a and 8b show a further specification of a operating head according to the invention. It differs from the operating head in FIG. 3 only in its handles. Thus the shank sections 30' do not connect laterally to the carrier sections 22 but extend centrally from the horn 20 at an angle to the longitudinal axis L. The shank sections 30' are followed laterally by gripping sections 32' extending substantially perpendicularly from the longitudinal axis L. The handle openings 34' are opened laterally and are only delimited by the carrier sections 22, the opposite gripping sections 32' and the free end 28 of the horn 20. FIG. 8a shows the operating head from above. As can be clearly seen here, the operating elements 40, 42 can be operated easily and simultaneously with different fingers without having to reach around. FIG. 8b shows the control head from below. Here it can be seen that an operator gripping the opposite gripping section 32' by hand can reach the operating elements 40, 42 from above and below with thumb and index finger or middle finger simultaneously.

LIST OF REFERENCE SIGNS 10 drawbar head
12 drawbar shaft
20 horn
22 carrier section
23 front surface
24 central section
26 first end
28 free end
30, 30' shank section
32, 32' gripping section
34, 34' handle opening
36 driver control handle
40, 42, 43 operating element
44 bulge
45, 45a, b recess
46 operating cam
L longitudinal axis
$Z_1$, $Z_2$ pivot axis

The invention claimed is:

1. An operating head for an industrial truck comprising:
a support extending along a longitudinal axis and comprising opposing carrier sections;
one or more gripping sections positioned opposite each of the opposing carrier sections, wherein the one or more gripping sections comprise an end coupled to the support and an opposing free end, wherein the opposing carrier sections and gripping sections at least partially define a handle opening; and
at least one operating element positioned on at least one of the opposing carrier sections, the at least one operating element comprising a cylindrical body extending along a cylindrical body axis and defining a bulge extending radially from the cylindrical body along a bulge axis,
wherein when the at least one operating element is in a rest position, the bulge extends towards the one or more gripping sections, and wherein the at least one operating element is pivotable about the cylindrical body axis by exerting a force against the bulge.

2. The operating head according to claim 1, wherein the at least one operating element is configured to be gripped at opposite sides of the bulge with fingers of an operator's hand when the operator's hand contacts the one or more gripping sections.

3. The operating head according to claim 1, wherein the at least one operating element is configured to be pivotable about its cylindrical body axis in a clockwise and in a counterclockwise direction.

4. The operating head according to claim 1, wherein at least a portion of the at least one operating element protrudes from each of the opposing carrier sections, and wherein the portion that protrudes from each of the opposing carrier sections extends into the handle opening.

5. The operating head according to claim 4, wherein the portion that protrudes from the carrier section comprises at least 50% of an outer surface of the at least one operating element.

6. The operating head according to claim 1, wherein the bulge defines a recess on opposing sides that are configured to engage one finger of an operator.

7. The operating head according to claim 1, wherein the at least one operating element comprises an operating cam formed on an outer surface.

8. The operating head according to claim 7, wherein the operating cam extends along a cam axis that is perpendicular to the bulge axis.

9. The operating head according to claim 1, further comprising at least one control handle positioned on the support opposite the free end of the one or more gripping sections, wherein the at least one control handle is configured to rotate about an axis of rotation that extends towards the one or more gripping sections.

10. The operating head of claim 1, wherein the opposing carrier sections extend along a carrier section axis that intersects the longitudinal axis.

11. A drawbar for an industrial truck having a drawbar shaft coupled to the industrial truck at one end and pivotable about a horizontal axis between an approximately upright position and a position inclined obliquely to a vertical axis, the drawbar comprising:
an operating head connected to an opposing uncoupled end of the drawbar shaft, the operating head comprising, a support extending along a longitudinal axis and comprising opposing carrier sections, one or more gripping sections positioned opposite each of the opposing carrier sections, wherein the one or more gripping sections comprise an end coupled to the support and an opposing free end, wherein the opposing carrier sections and gripping sections at least partially define a handle opening; and at least one operating element positioned on at least one of the opposing carrier sections, the at least one operating element comprising a cylindrical body extending along a cylindrical body axis and defining a bulge extending radially from the cylindrical body along a bulge axis, wherein when the at least one operating element is in a rest position, the bulge extends towards the one or more gripping sections, and wherein the at least one operating element is pivotable about the cylindrical body axis by exerting a force against the bulge.

12. The drawbar according to claim 11, wherein the at least one operating element is configured to be gripped on opposing sides of the bulge by two fingers of an operator whose hand contacts the one or more gripping sections opposite the bulge, and wherein the opposing sides of the bulge are configured to be gripped by the two fingers when the drawbar shaft is in an upright position and when the drawbar shaft is in an inclined position.

13. An operating unit for an industrial truck comprising:

a steering column rotatable about a vertical axis of rotation; and an operating head positioned on the steering column, the operating head comprising, a support extending along a longitudinal axis and comprising opposing carrier sections;

one or more gripping sections positioned opposite each of the opposing carrier sections, wherein the one or more gripping sections comprise an end coupled to the support and an opposing free end, wherein the opposing carrier sections and one or more gripping sections at least partially define a handle opening; and at least one operating element positioned on at least one of the opposing carrier sections, the at least one operating element comprising a cylindrical body extending along a cylindrical body axis and defining a bulge extending radially from the cylindrical body along a bulge axis, wherein when the at least one operating element is in a rest position, the bulge extends towards the one or more gripping sections, and wherein the at least one operating element is pivotable about the cylindrical body axis by exerting a force against the bulge.

* * * * *